United States Patent
Ohya et al.

[11] Patent Number: 5,091,270
[45] Date of Patent: Feb. 25, 1992

[54] MAGNETIC RECORDING MEDIUM LUBRICATED BY A MIXTURE OF METHYL BRANCHED ISO ESTER COMPOUNDS SYNTHESIZED BY THE OKO PROCESS

[75] Inventors: Takao Ohya; Yasuo Nishikawa; Satoru Hayakawa, all of Kanagawa, Japan

[73] Assignee: Fuji Photo Film Co., Ltd., Kanagawa, Japan

[21] Appl. No.: 382,880

[22] Filed: Jul. 21, 1989

[30] Foreign Application Priority Data

Jul. 21, 1988 [JP] Japan ............... 63-182676

[51] Int. Cl.$^5$ ............... G11B 23/00; G11B 5/72
[52] U.S. Cl. ............... 428/695; 428/694; 428/900; 252/56 R; 252/56 S
[58] Field of Search ............ 428/900, 694, 695; 252/56 R, 56 S

[56] References Cited

U.S. PATENT DOCUMENTS

| | | | |
|---|---|---|---|
| 3,655,562 | 4/1972 | Chao et al. | 252/51.5 A |
| 3,809,652 | 5/1974 | Brennan | 252/56 R |
| 4,049,725 | 9/1977 | Gueant et al. | 260/638 B |
| 4,675,250 | 6/1987 | Kanai et al. | 428/403 |
| 4,772,522 | 9/1988 | Kubota et al. | 428/328 |
| 4,786,551 | 11/1988 | Ootani et al. | 428/323 |
| 4,790,957 | 12/1988 | Mach et al. | 560/76 |

Primary Examiner—Merrell C. Cashion, Jr.
Assistant Examiner—Stevan A. Resan
Attorney, Agent, or Firm—Sughrue, Mion, Zinn, Macpeak & Seas

[57] ABSTRACT

A magnetic recording medium is disclosed, which has a magnetic layer on a non-magnetic support, wherein at least a mixture of ester compounds shown by formula (I) obtained by the reaction of a straight chain or branched fatty acid having from 12 to 30 carbon atoms and branched alcohols having from 10 to 32 carbon atoms synthesized by oxo synthesis is retained in or on the magnetic layer:

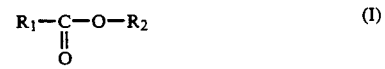

wherein $R_1$ represents a straight chain or branched alkyl group having from 11 to 29 carbon atoms or a straight chain or branched alkenyl group having from 11 to 29 carbon atoms, and $R_2$ represents a branched alkyl group having from 10 to 32 carbon atoms. The magnetic recording medium has an excellent running durability in wide ranges of temperature and humidity condition.

10 Claims, No Drawings

MAGNETIC RECORDING MEDIUM LUBRICATED BY A MIXTURE OF METHYL BRANCHED ISO ESTER COMPOUNDS SYNTHESIZED BY THE OKO PROCESS

FIELD OF THE INVENTION

This invention relates to a magnetic recording medium having a magnetic layer mainly composed of a ferromagnetic powder and a binder resin or a magnetic thin layer of a ferromagnetic metal on a non-magnetic support, and more particularly to a magnetic recording medium having an excellent running durability in wide ranges of temperature and humidity condition.

BACKGROUND OF THE INVENTION

With the increase of the recording density of magnetic recording, the surface property of the magnetic layer becomes more smooth, whereby the problem that the coefficient of friction between the magnetic layer and each part in a recording and reproducing apparatus during running is increased, and the obstruction of the smooth running of the magnetic recording medium or damage of the magnetic layer becomes remarkable.

Furthermore, with the popularization of video tape recorders (VTR), personal computers, word processors, etc., the conditions, particularly the temperature and humidity conditions in use of magnetic recording media recently become wide. Also, magnetic recording media are used for the system of repeating the on-off action of a magnetic head onto the magnetic layer many times in the form of rotary magnetic media such as floppy disks for personal computers and word processors, the aforesaid problem of the running durability of a magnetic recording medium under high temperature conditions or the condition that a thermocycle from a high temperature to a low temperature is continued for a long period of time becomes an important issue.

For solving the aforesaid problems, in a so-called coating type magnetic recording medium when the magnetic layer is mainly composed of a ferromagnetic powder and a binder resin, a method of adding a fatty acid ester into the magnetic layer (as described in JP-A-50-22603, JP-A-50-153905, and JP-A-55-139637 (the term "JP-A" as used herein means an "unexamined published Japanese patent application") and JP-B 39-28367, JP-B-41-18065, and JP-B-47-12950 (the term "JP-B" as used herein means an "examined Japanese patent publication")), a method of adding a silicone compound into the magnetic layer (as described in U.S. Pat. No. 2,654,681), a method of adding a fatty acid or a hydrocarbon into the magnetic layer, etc., are proposed.

However, in such conventional techniques, there are problems that the aforesaid additives are liable to vaporize from the surface of the magnetic layer at a high temperature and on the other hand, the additives deposit on the surface of the magnetic layer at a low temperature to cause clogging of a magnetic head or increasing of drop out, etc. Also, when a large amount of the additive is added to the magnetic layer for obtaining the increased effect, the additive plasticizes the binder resin of the magnetic layer to weaken the film strength of the magnetic layer, whereby the durability is reduced.

For solving the aforesaid problems, a method of adding a fatty acid ester having a high molecular weight and having a branched hydrocarbon group or an unsaturated hydrocarbon group to the magnetic layer so that the additive does not deposit on the surface of the magnetic layer at a low temperature is disclosed in JP-A-58-160425, JP-A-58-218038, JP-A-60-205827, JP-A-61-294637, and JP-A-62-125529.

However, since these esters are in liquid state at normal temperature, are easily compatible with a binder resin, and plasticize the binder resin, which results in reducing the film strength of the magnetic layer, the sufficient effect is not obtained by the use of such esters. On the other hand, the ester compounds having a straight chain alkyl group are relatively excellent in lubricating property but many of them have a high melting point, and hence the use of such ester compounds frequently cause a problem that the additive deposits on the surface of the magnetic layer at low temperatures.

The aforesaid problems in the conventional techniques become severer as the surface of the magnetic recording medium becomes smoother. For example, in a so-called coating type magnetic recording medium having a magnetic layer mainly composed of a ferromagnetic powder and a binder resin wherein a polar group-containing polymer having a large capability of accelerating the dispersion of the ferromagnetic powder is used as the binder resin (as disclosed in JP-A-57-133521, JP-A-57-44227, JP-A-60-238309, and JP-A-61-104329) or in a so-called metal thin layer type magnetic recording medium having a thin layer of a ferromagnetic metal or alloy as the magnetic layer wherein the surface roughness of the magnetic layer is less than 0.01 μm, the aforesaid problems become more serious.

Accordingly, an acceptable magnetic recording medium having a magnetic layer having a smooth surface and being suitable for high density recording has not yet been developed with respect to running durability under expanded environmental conditions.

SUMMARY OF THE INVENTION

This invention has been made for improving the aforesaid problems in conventional techniques and the object of this invention is to provide a magnetic recording medium having an excellent running durability under a wide environmental condition and yet being suitable for high density recording.

That is, according to this invention, there is provided a magnetic recording medium having a magnetic layer on a non-magnetic support, wherein at least one ester compound shown by formula (I), obtained by the reaction of a straight chain or branched fatty acid having from 12 to 30 carbon atoms and a branched alcohol having from 10 to 32 carbon atoms synthesized by oxo synthesis is incorporated in the magnetic layer or retained on the magnetic layer:

wherein $R_1$ represents a straight chain or branched alkyl group having from 11 to 29 carbon atoms or a straight chain or branched alkenyl group having from 11 to 29 carbon atoms, and $R_2$ represents a branched alkyl group having from 10 to 32 carbon atoms.

DETAILED DESCRIPTION OF THE INVENTION

In the ester compound shown by formula (I) described above, the alcohol moiety thereof is synthesized by oxo synthesis and the feature thereof is a structure having at least two branches. The branches in the alcohol moiety may have different carbon atoms and the branched manner may vary. Thus, the ester compound is not liable to crystallize, is in a liquid state at low temperatures, and can lubricate the magnetic layer for a long period of time. Also, a second feature of the aforesaid ester compound for use in this invention is that the carbon atom numbers of the fatty acid moiety thereof and the alkyl group or alkenyl group of the alcohol moiety thereof are in a specific large range and the ester compound has a high molecular weight, thus the ester compound is reluctant to vaporize from the surface of the magnetic layer and can lubricate the magnetic layer even at a high temperature. On the other hand, the upper limit of the size of the molecule of the ester compound is restricted to a certain value, whereby the viscosity of the ester compound is not increased to an extent of making fluid lubrication impossible.

Accordingly, by retaining the ester compound shown by formula (I) described above in or on the magnetic layer, the running durability of the magnetic recording medium in a wide environmental condition of from a lower temperature to a high temperature can be secured.

The ester compound for use in this invention shown by aforesaid formula (I) is obtained by the reaction of a fatty acid and an alcohol synthesized by oxo synthesis. The feature of the products is that the products have various sorts of branches having various numbers of carbon atoms and have various structural isomers. The structural feature is effective for attaining the aforesaid object of this invention as described above.

The oxo synthesis used in this invention is described in Kirk-Othmer, *Concise Encyclopedia of Chemical Technology*, edited by Martin Grayson, published by John & Wiley Sons Inc. (1985). The oxo synthesis comprises reacting an olefin, carbon monoxide and hydrogen in the presence of a catalyst (e.g., cobalt catalyst, and rhodium catalyst) in a reaction vessel under a high-temperature and high-pressure condition, for example, at 100° to 200° C. and 10 to 45 MPa, to produce mainly two kinds of aldehyde isomers according to a so-called hydroformylation reaction as shown below

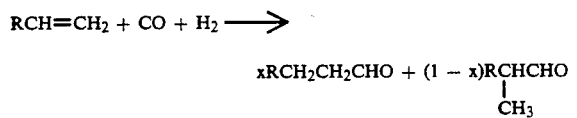

and subsequently hydrogenating the resulting aldehydes at a temperature of 50 to 250° C. and a pressure of 0.3 to 24 MPa, whereby the alcohols used as a starting material for the ester compound of this invention are obtained.

The alcohol synthesized by the oxo synthesis has from 10 to 32 carbon atoms. If the carbon atom number is less than 10, the ester compound is liable to vaporize from the surface of the magnetic layer to cause a problem in running durability at high temperatures while if the carbon atom number is larger than 32, the initial motive torque is undesirably increased.

The fatty acid being reacted with the alcohol synthesized by the aforesaid oxo synthesis has a straight chain or branched alkyl or alkenyl group having from 12 to 30 carbon atoms and preferably from 13 to 21 carbon atoms. If the carbon atom number is less than 12, the ester compound obtained is liable to vaporize from the surface of the magnetic layer at high temperature to cause problem in running durability. On the other hand, if the carbon atom number is larger than 30, the initial motive torque is undesirably increased.

Furthermore, when in formula (I) described above, the sum of the carbon atom number of $R_1$ and the carbon atom number of $R_2$ is from 26 to 46, preferably from 30 to 41 carbon atoms, and $R_1$ is a straight chain alkyl group, the object of this invention can be more effectively attained.

Examples of the ester compound for use in this invention are isomyristyl laurate, isostearyl laurate, isodecyltetradecyl laurate, isoundecyl laurate, isopalmityl myristate, isobehenyl myristate, isopalmityl palmitate, isostearyl palmitate, isopalmity oleate, isostearyl oleate, isomyristyl stearate, isopalmityl stearate, isostearyl stearate, isobehenyl stearate, isomyristyl behenate, isostearyl behenate, isomyristyl montanate, and isostearyl montanate. The term "iso" in the aforesaid compounds means a branch by the oxo synthesis. Of these compounds, isostearyl stearate, isostearyl palmitate, isopalmityl stearate, and isostearyl behenate are particularly preferred.

It is preferred that the amount of the aforesaid ester compound is from 1 to 25% by weight, and particularly from 2 to 20% by weight based on the weight of the ferromagnetic powder.

Also, the ester compound can be formed on the surface of the magnetic layer as a top coat. In this case, the amount of the top coat is preferably in the range of from 1 to 100 mg/m$^2$, and more preferably from 2 to 50 mg/m$^2$ on the coating type magnetic layer and from 5 to 80 mg/m$^2$ on the metal thin layer type magnetic layer.

If the amount of the ester compound is over the aforesaid range, the amount of the ester compound on the surface of the magnetic layer becomes excessive and causes a problems such as sticking, etc., or plasticizes the binder resin of the magnetic layer to reduce the film strength of the magnetic layer and reduce the running durability. On the other hand, if the amount of the ester compound is less than the aforesaid range, the sufficient effect is not obtained and the object of this invention cannot be attained.

In this invention, as a method of retaining the aforesaid ester compound shown by formula (I) in or on the magnetic layer, there are methods of adding the compound into the magnetic layer and methods of applying the compound on the surface of the magnetic layer as a top coat.

When the magnetic layer is a thin layer of a ferromagnetic metal or alloy, the ester compound is usually applied on the surface of the magnetic layer as a top coat. As a method of applying the ester compound as a top coat, there may be used a method of coating or spraying the ester compound onto the surface thereof as a solution thereof in a solvent (e.g., methyl ethyl ketone, ethyl acetate, chloroform, tetrahydrofuran, benzene, and toluene) and a method by a Langmuir Projet method as described in JP-A-50-75001, *Oyo Butsuri Gakkaishi*

(Journal of Applied Physics Society), 52, No. 7 (1983) and Polymer News, No. 25 (1985).

In this invention, the aforesaid ester compound shown by formula (I) may be used together with other conventionally known lubricants.

As the lubricant which can be used together with the ester compound in this invention, there are saturated or unsaturated fatty acids (such as myristic acid, stearic acid, oleic acid, etc.), metal soaps, fatty acid amides, fatty acid esters other than the ester compounds for use in this invention (such as various monoesters, fatty acid esters of polyhydric esters such as sorbitol, glycerol, etc., and esterified products of polybasic acids), higher aliphatic alcohols, monoalkyl phosphates, dialkyl phosphates, trialkyl phosphates, paraffins, silicone oils, animal and vegetable oils, mineral oils, higher fatty acid amines, inorganic fine powders (such as graphite, silica, molybdenum disulfide, etc.), fine powders of resins (such as polyethylene, polypropylene, polyvinyl chloride, an ethylene/vinyl chloride copolymer, polytetrafluoroethylene, etc.), α-olefin polymers, unsaturated aliphatic hydrocarbons which are in a liquid state at normal temperatures, fluorocarbons, etc.

The preferred amount of the lubricant existing together with the ester compound of this invention depends upon the manner of use, but is generally from 1/10 to twice the amount of the ester compound of this invention.

There is no particular restriction on the ferromagnetic powder which is used for the coating type magnetic recording medium of this invention. For example, there are a ferromagnetic alloy powder, $\gamma$-$Fe_2O_3$, $Fe_3O_4$, Co-modified iron oxide, $CrO_2$, iron nitride, modified barium ferrite, and modified strontium ferrite.

There is no particualr restriction on the form of the ferromagnetic powder for use in this invention, but the ferromagnetic powder having an acicular form, a granular form, a die-like form, a rice grain form, or a tabular form is usually used. The specific area of the ferromagnetic powder is preferably at least 10 $m^2/g$ in electromagnetic characteristics.

In the aforesaid ferromagnetic powder, the powder of Co-modified iron oxide and the powder of ferromagnetic alloy are preferred for attaining the object of this invention. In particular, as the ferromagnetic alloy powder, the powder of an Fe-Co alloy or Fe-Ni alloy having a coercive force Hc of at least 800 Oe, a saturation magnetization ($\delta_s$) of at least 100 emu/g, a grain size of at least 30 $m^2/g$ in specific area and an acicular ratio of at least 8 is preferred.

The binder for the magnetic layer in this invention can be selected from ordinary binders, Examples of the binder are a vinyl chloride/vinyl acetate copolymer, a copolymer of vinyl chloride and vinyl acetate with vinyl alcohol, a maleic acid and/or acrylic acid, a vinyl chloride/vinylidene chloride copolymer, a vinyl chloride/acrylonitrile copolymer, an ethylene/vinyl acetate copolymer, a cellulose derivative (such as a nitrocellulose resin), an acryl resin, a polyvinyl acetal resin, a polyvinylbutyral resin, an epoxy resin, a phenoxy resin, a polyurethane resin, a polycarbonate polurethane resin, etc.

For further increasing the dispersibility and the durability of the binder resin, it is preferred to introduce a polar group (such as an epoxy group, $CO_2H$, OH, $NH_2$, $SO_3M$, $OSO_3M$, $PO_3M_2$, and $OPO_3M_2$ (wherein M represents a hydrogen atom, an alkali metal, or ammonium, and when plural Ms exist in one group, Ms may be the same or different)) into the binder molecule. The content of the polar group is preferably in the range of from $10^{-6}$ to $10^{-4}$ equivalent per gram of the polymer.

The polymer binders illustrated above are used singly or as a mixture thereof and the binder is hardened by adding a known isocyanate cross-linking agent.

Also, the ester compound for use in this invention is applied for a binder system of using an acrylic ester series oligomer and a monomer as the binder and being hardened by the irradiation of radiations.

As the material for the non-magnetic support for the coating type magnetic recording medium of this invention, there are polyesters such as polyethylene terephthalate, polyethylene-2,6-naphthalate, etc.; polyolefins such as polyethylene, polypropylene, etc.; cellulose derivatives such as cellulose triacetate, etc.; and resins such as polycarbonate, polyimide, polyamidoimide, etc. If necessary, the support may be matallized by a metal such as aluminum, etc.

The thickness of the support is usually from 3 to 100 $\mu$m, preferably from 3 to 20 $\mu$m for magnetic recording tape, and preferably from 20 to 100 $\mu$m for magnetic recording disk.

The content of the whole binders in the magnetic layer of the magnetic recording medium of this invention is usually from 10 to 100 parts by weight, and preferably from 20 to 40 parts by weight per 100 parts by weight of the ferromagnetic powder.

The magnetic layer of the coating type magnetic recording medium of this invention can further contain inorganic particles having a Mohs' hardness of at least 5. There is no particular restriction on the inorganic particles if the Mohs' hardness is at least 5. Examples of such inorganic particles are particles of $Al_2O_3$ (Mohs' hardness 9), TiO (Mohs' hardness 6), $TiO_2$ (Mohs' hardness 6.5), $SiO_2$ (Mohs' hardness 7), $SnO_2$ (Mohs' hardness 6.5), $Cr_2O_3$ (Mohs' hardness 9), and $\alpha$-$Fe_2O_3$ (Mohs' hardness 5.5).

The inorganic particles having a Mohs' hardness of at least 8 are particularly preferred. If inorganic particles having a Mohs' hardness of lower than 5 are used, the inorganic particles are liable to fall from the magnetic layer and shown almost no abrasive action to a magnetic head, whereby clogging of the head is liable to occur and the running durability of the magnetic recording medium becomes poor.

The content of the inorganic particles is usually from 0.1 to 20 parts by weight, and preferably from 1 to 10 parts by weight based on 100 parts by weight of the ferromagnetic powder.

Also, the magnetic layer contains preferably carbon black (having, particularly a mean particle size of from 10 to 300 nm), etc., in addition to the aforesaid inorganic particles.

Then, the production method for the coating type magnetic recording medium of this invention is explained.

First, the ferromagnetic powder, the binder, the aforesaid ester compound shown by formula (I), and, if necessary, other filler and additives are kneaded with a solvent to provide a magnetic coating composition. As the solvent which is used for kneading the aforesaid components, a solvent which is usually used for the preparation of magnetic coating compositions can be used.

There is no particular restriction on the kneading method and also the addition order of the components can be properly selected.

At the preparation of the magnetic coating composition, known additives such as a dispersing agent, an antistatic agent, etc., can also be used.

Examples of the dispersing agent are fatty acids having from 12 to 22 carbon atoms, the salts or esterified products of the fatty acids and the compounds obtained by replacing a part or the whole of the hydrogens of the fatty acids with fluorine atoms, amides of the aforesaid fatty acids, aliphatic amines, high alcohols, polyalkylene oxide alkylphosphoric acid esters, alkylphosphoric acid esters, alkyboric acid esters, sarcosinates, alkyl ether esters trialkylpolyolefins, and oxy quaternary ammonium salts.

In the case of using a dispersing agent, the amount thereof is usually from 0.1 to 10 parts by weight to 100 parts by weight of ferromagnetic powder being used.

Examples of the antistatic agent are conductive fine powders such as carbon black, carbon black graft polymers, etc.; natural surface active agents such as saponin, etc.; alkylene oxide series, glycerol series, and glycidol series nonionic surface active agents; cationic surface active agents such as higher alkylamines, quaternary ammonium salts, salts of heterocyclic compounds (e.g., pyridine), phosphoniums, sulfoniums, etc.; anionic surface active agents having an acid group such as carboxylic acid, phosphoric acid, sulfuric acid ester group, phosphoric acid group, etc.; and amphoteric surface active agents such as amino acids, aminosulfonic acids, sulfuric acid esters or phosphoric acid esters of aminoalcohols, etc.

In the case of using the aforesaid conductive powder as the antistatic agent, the amount thereof is from 0.1 to 10 parts by weight per 100 parts by weight of the ferromagnetic powder and in the case of using the surface active agent, the amount thereof is from 0.12 to 10 parts by weight per 100 parts by weight of the ferromagnetic powder.

In addition, the aforesaid additives such as the dispersing agent, the antistatic agent, etc., do not always have the aforesaid function and effect in strict meaning and, for example, a dispersing agent may also function as an antistatic agent. Accordingly, the effect and the function of the compound classified as above are not limited to the matters classified above and in the case of using a material showing plural effects and functions, the addition amount thereof is preferably determined by considering the effects and the functions.

The magnetic coating composition prepared as described above is coated on the aforesaid non-magnetic support. The coating composition can be coated directly on the aforesaid non-magnetic support or can be coated through an interlayer such as an adhesive layer. The interlayer is a single layer of an adhesive or a composite layer containing non-magnetic particles such as carbon, etc., in a binder.

The binder for the interlayer containing carbon can be selected from various binders which are used for the magnetic layers as the binders. In this case, the particle size of carbon is preferably from 10 to 50 nm and the binder/carbon ratio is preferably from 100/10 to 100/150 by weight ratio. The thickness of the interlayer is preferably from 0.1 to 2 $\mu$m in the case of a single adhesive layer and from 0.5 to 4 $\mu$m in the case of composite layer containing a non-magnetic powder.

The interlayer may further contain a lubricant similar to or different from the lubricant which is used for the magnetic layer.

The details of the dispersing method of the aforesaid ferromagnetic powder and the binder and the coating method on the non-magnetic support are described in JP-A-54-46011 and JP-A-54-21805.

The thickness of the magnetic layer thus coated is usually from 0.5 to 10 $\mu$m and preferably from 0.7 to 6.0 $\mu$m by dry thickness.

When the magnetic recording medium is used as a magnetic recording tape, the magnetic layer coated on a non-magnetic support is usually subjected to a treatment of orienting the ferromagnetic powder in the magnetic layer, that is, to a magnetic orientation treatment and then dried. Thereafter, if necessary, a surface smoothening treatment is applied to the surface of the magnetic layer.

In this invention, the magnetic layer may be a magnetic thin layer of ferromagnetic metals such as Fe, Co, Ni, etc., or alloys such as Fe-Co, Fe-Ni, Co-Ni, Fe-Rh, Co-P, Co-B, Co-Y, Co-La, Co-Ce, Ca-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Cu, Co-Ni-W, Co-Ni-Re, etc. The magnetic thin layer can be formed on the non-magnetic support by electroplating, electroless playing, vapor phase plating, sputtering, vapor deposition, ion plating and the like. The thickness of the magnetic thin layer is generally from 0.02 to 2 $\mu$m and preferably from 0.05 to 0.8 $\mu$m.

It is preferred to incorporate oxygen or nitrogen into the ferromagnetic metal thin layer by forming the thin layer in the oxygen or nitrogen stream, whereby the elctromagnetic characteristics and the running durability of the layer are improved. Other than oxygen and nitrogen, Cr, Ga, As, Sr, Nb, No, Rh, Pd, Sn, Sb, Te, Pm, Re, Os, Ir, Au, Hg, Pb, Bi and Mg may also be contained in the ferromagnetic metal thin layer.

There are no particular restriction on the surface property of the ferromagnetic metal thin layer, but it is particularly preferred to provide protrusion of 1 to 500 nm in height in view of the running property and the running durability.

As the material for the non-magnetic support for the metal thin layer type magnetic recording medium of this invention, there are plastics such as polyethylene terephthalate, polyimide, polyamide, polyvinyl chloride, cellulose triacetate, polycarbonate, polyethylene naphthalate, polyphenylene sulfide, etc., metals such as Al, Ti, stainless steel, etc., and the like. The thickness of the support is preferably from 4 to 50 $\mu$m.

An interlayer may be provided on the support so as to improve adhesiveness with the ferromagnetic metal thin layer or improve the electromagnetic characteristics. Further, it is preferred to provide fine protrusion of 1 to 50 nm in height on the surface of the non-magnetic support at the density of from $2 \times 10^6$ to $2 \times 10^8$ protrusion/mm$^2$, which effectively improve the running durability.

Then, the invention is explained by the following example, wherein "parts" are "by weight".

| | |
|---|---|
| Co-Modified FeO$_x$ Powder (x = 1.4, mean particle size: 0.3 $\mu$m $\times$ 0.03 $\mu$m) | 100 parts |
| Vinyl Chloride/Vinyl Acetate/Maleic Anhydride Copolymer (400X110A, trade name, made by Nippon Zeon K.K.) | 13 parts |
| Polyurethane (N-2304, trade name, made by Nippon Polyurethane K.K.) | 4 parts |
| Cr$_2$O$_3$ | 5 parts |
| Carbon Black (Asahi #80, trade name, made by Asahi Carbon K.K.) | 5 parts |

-continued

| Ester Compound | shown in Table 1 |
|---|---|
| Methyl Ethyl Ketone | 72 parts |
| Toluene | 72 parts |
| Methyl Isobutyl Ketone | 36 parts |

The aforesaid components were kneaded in ball mill for about 10 hours to uniformly disperse the ferromagnetic powder. Thereafter, 7 parts of polyisocyanate (Corronate 3041, trade name, made by Nippon Polyurethane K.K.) was added thereto, followed by further kneading for one hour to provide a magnetic coating composition.

Then the coating composition was coated on a polyethylene terephthalate film of 75 μm in thickness and 500 mm in width and a surface roughness of 0.028 μm (cut off value of 0.25 μm) as Ra value to form a magnetic layer, dried and then subjected to a surface smoothening treatment by calender. The thickness of the magnetic layer thus formed was 2.5 μm.

The magnetic recording medium thus obtained was cut into a disk (floppy disk) of 3.5 inches in diameter to provide a test sample.

The ester compounds (including comparative ester compounds) used in the example (including comparative example) are illustrated in Table 1, wherein the addition amount is shown by parts by weight.

TABLE 1

| Sample No. | Ester Compound | Amount |
|---|---|---|
| 1 | Isostearyl Stearate | 0.5 |
| 2 | Isostearyl Stearate | 3 |
| 3 | Isostearyl Stearate | 7.5 |
| 4 | Isostearyl Stearate | 20 |
| 5 | Isostearyl Stearate | 30 |
| 6 | Isolauryl Myristate | 7.5 |
| 7 | Isostearyl Myristate | 7.5 |
| 8 | Isostearyl Palmitate | 7.5 |
| 9 | Isopalmityl Stearate | 7.5 |
| 10 | Isomyristyl Behenate | 7.5 |
| 11 | Isolauryl Behenate | 7.5 |
| 12 | Isostearyl Montanate | 7.5 |
| 13 | Isostearyl Oleate | 7.5 |
| 14 | Isodecyl Laurate | 7.5 |
| 15 | Isotetradecyl Montanate | 7.5 |
| 16 | Isooctyl Caprylate | 7.5 |
| 17 | Oleyl Oleate | 7.5 |
| 18 | 2-Position Branched Palmityl Stearate | 7.5 |

In Sample Nos. 1 to 15, the alcohol moiety of the ester compound used was synthesized by oxo synthesis, whereas in Sample Nos. 16 and 17 alcohol moieties of the ester compounds used were synthesized by reduction of natural straight-chain fatty acids instead of the oxo synthesis.

On each of the samples thus prepared, the running durability under a high-temperature and high-humidity condition (70° C., 80% RH) or under a low temperature condition (5° C., 50% RH) and the running durability under the thermocycle shown below were measured using a 3.5 inch floppy disk drive (OA-D32W, trade name, made by Sony Corporation). Thus, each sample was continuously rotated at 300 r.p.m. and the running durability was shown by the pass number until the output was reduced to 80% of the initial value.

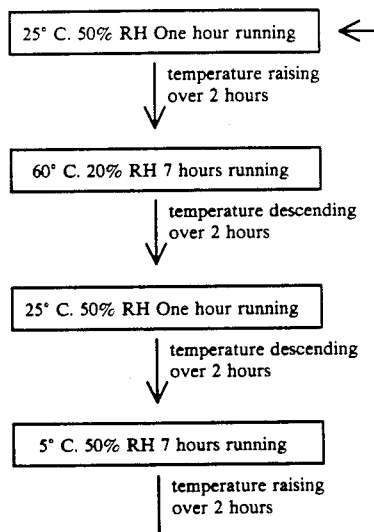

The results obtained are shown in Table 2 below. In the table, Sample Nos. 1 to 15 are samples of this invention and Sample Nos. 16 to 18 are comparative samples.

TABLE 2

| Sample No. | Running Durability* | | |
|---|---|---|---|
| | 70° C., 80% RH | Thermocycle | 5° C., 50% RH |
| 1 | 1000 | 1000 | 1000 |
| 2 | 3000 | 3000 | 3000 |
| 3 | >4000 | >4000 | >4000 |
| 4 | >4000 | >4000 | >4000 |
| 5 | 1500 | 1000 | 1000 |
| 6 | 3500 | 3500 | 3400 |
| 7 | >4000 | >4000 | >4000 |
| 8 | >4000 | >4000 | >4000 |
| 9 | >4000 | >4000 | >4000 |
| 10 | >4000 | >4000 | >4000 |
| 11 | >4000 | >4000 | >4000 |
| 12 | >4000 | >4000 | >4000 |
| 13 | 3000 | >4000 | 3700 |
| 14 | 3000 | 3500 | 3000 |
| 15 | 3000 | 3000 | 3000 |
| 16 | 1000 | 500 | 3000 |
| 17 | 1000 | 2000 | 1500 |
| 18 | 1500 | 2000 | 1500 |

*Number of passes ($\times 10^4$)

As shown in the above results, Sample Nos. 2 to 4 and 6 to 13 of this invention using the ester compound shown by formula (I) at a proper amount defined in this invention showed a sufficient running durability of at least 30000,000 passes in any environmental conditions.

On the other hand, Sample No. 1 and No. 5 using the ester compound shown by formula (I) at an amount outside the range defined by the invention did not show such sufficient running durability.

Also, when the carbon atom number of the ester compound used is small (Sample No. 16), the running durability under the high-temperature and high-humidity condition and the thermocycle was insufficient since, it is considered, that the ester compound vaporized from the surface of the magnetic layer at high temperatures.

Furthermore, Sample Nos. 17 and 18 using the ester compound the alcohol moiety of which was not synthesized by the oxo synthesis showed considerably low running durability.

For the results shown above, it can be seen that by retaining the ester compound obtained by reacting a fatty acid having a carbon atom number in the specific range and an alcohol synthesized by oxo synthesis and having a carbon atom number in the specific range defined by the invention in the magnetic layer in a definite amount defined by the invention, the running durability of the magnetic recording medium under wide environmental conditions can be improved.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a magnetic layer on a non-magnetic support, wherein at least a mixture of ester compounds shown by formula (I) obtained by the reaction of a straight chain or branched fatty acid having from 12 to 30 carbon atoms and branched alcohols having from 10 to 32 carbon atoms synthesized by oxo synthesis is retained in or on the magnetic layer:

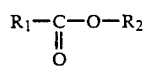 (I)

wherein $R_1$ represents a straight chain or branched alkyl group having from 11 to 29 carbon atoms or a straight chain or branched alkenyl group having from 11 to 29 carbon atoms, and $R_2$ represents a branched alkyl group having from 10 to 32 carbon atoms.

2. The magnetic recording medium as claimed in claim 1, wherein the sum of the carbon atom number of $R_1$ and the carbon atom number of $R_2$ in formula (I) is from 26 to 46.

3. The magnetic recording medium as claimed in claim 1, wherein the magnetic layer is mainly composed of a ferromagnetic powder and a binder resin.

4. The magnetic recording medium as claimed in claim 3, wherein the amount of the mixture is retained in the magnetic layer in an amount of from 1 to 25 parts by weight to 100 parts by weight of the ferromagnetic powder.

5. The magnetic recording medium as claimed in claim 3, wherein the amount of the mixture is retained in the magnetic layer in an amount of from 2 to 20 parts by weight to 100 parts by weight of the ferromagnetic powder.

6. The magnetic recording medium as claimed in claim 3, wherein the mixture is coated on the magnetic layer in an amount of from 1 to 100 mg/m$^2$.

7. The magnetic recording medium as claimed in claim 3, wherein the mixture is coated on the magnetic layer in an amount of from 2 to 50 mg/m$^2$.

8. The magnetic recording medium as claimed in claim 1, wherein the magnetic layer is a thin layer of a ferromagnetic metal or alloy thereof.

9. The magnetic recording medium as claimed in claim 8, wherein the mixture is coated on the magnetic layer in an amount of from 1 to 100 mg/m$^2$.

10. The magnetic recording medium as claimed in claim 8, wherein the mixture is coated on the magnetic layer in an amount of from 5 to 80 mg/m$^2$.

* * * * *